(12) United States Patent
Goi

(10) Patent No.: US 12,438,423 B2
(45) Date of Patent: Oct. 7, 2025

(54) MODULAR IMPREGNATION PLANT FOR COMPONENTS OF ELECTRIC MOTORS

(71) Applicant: TECNOFIRMA S.P.A., Monza (IT)

(72) Inventor: Francesco Goi, Giussano (IT)

(73) Assignee: TECNOFIRMA S.P.A., Monza (IT)

( * ) Notice: Subject to any disclaimer, the term of this patent is extended or adjusted under 35 U.S.C. 154(b) by 109 days.

(21) Appl. No.: 18/263,361

(22) PCT Filed: Mar. 3, 2022

(86) PCT No.: PCT/IB2022/051881
§ 371 (c)(1),
(2) Date: Jul. 28, 2023

(87) PCT Pub. No.: WO2022/195392
PCT Pub. Date: Sep. 22, 2022

(65) Prior Publication Data
US 2024/0079939 A1    Mar. 7, 2024

(30) Foreign Application Priority Data
Mar. 16, 2021    (IT) .................. 102021000006236

(51) Int. Cl.
H02K 15/12    (2025.01)
(52) U.S. Cl.
CPC .................. H02K 15/12 (2013.01)
(58) Field of Classification Search
CPC ...................................... H02K 15/12
See application file for complete search history.

(56) References Cited

U.S. PATENT DOCUMENTS 2,561,982 A * 7/1951 Hanna ............... H02K 15/12
427/544
7,491,032 B1 * 2/2009 Powell ............... F04D 29/329
29/889.71

(Continued)

FOREIGN PATENT DOCUMENTS

| CN | 106712412 B | 3/2019 |
| DE | 102019106392 A1 | 9/2020 |

(Continued)

OTHER PUBLICATIONS

International Search Report and Written Opinion mailed Jun. 14, 2022 for PCT/IB2022/051881 to Tecnofirma S.P.A. filed Mar. 3, 2022.

*Primary Examiner* — Nahida Sultana
(74) *Attorney, Agent, or Firm* — Vorys, Sater, Seymour and Pease LLP

(57) ABSTRACT

Impregnation plant for electric motors axial symmetrical components including: a fixed support frame; a fixed heating station to heat each component to a predefined temperature, each fixed heating station has one or more motorized support devices to support the components and a rotary movement, in both directions of rotation around a predefined rotation axis, and a tilting movement, with respect to a predefined plane are provided on each component mounted on its respective support device; an impregnation module to cover at least part of each component with an impregnating substance; and a transport and loading/unloading module to transfer components from and toward the fixed heating stations. The support frame has a handling and guiding apparatus, having movably mounted thereon impregnation modules and the transport and loading/unloading modules and, removably selectively receive a further movable work module of the impregnation plant.

12 Claims, 6 Drawing Sheets

(56) References Cited

U.S. PATENT DOCUMENTS

2020/0059142 A1* 2/2020 Berthold ................. H02K 15/12
2024/0162775 A1* 5/2024 Lang ....................... H02K 15/12

FOREIGN PATENT DOCUMENTS

EP      3756770 A1   12/2020
JP      6243633 B2   12/2017
WO   2020193098 A1   10/2020

* cited by examiner

MODULAR IMPREGNATION PLANT FOR COMPONENTS OF ELECTRIC MOTORS

CROSS-REFERENCE TO RELATED APPLICATIONS

This is a § 371 National Stage Application of International Application No. PCT/IB2022/051881 filed on Mar. 3, 2022, claiming the priority of Italian Patent Application No. 102021000006236 filed on Mar. 16, 2021.

The present invention relates, in general, to an impregnation plant for components of electric motors and, specifically, to a modular impregnation plant for stators and/or rotors of electric motors.

As known, an electric motor is formed of a stator and a rotor. These two components, when properly combined with each other, generate a magnetic field as necessary for the operation of the electric motor. The stator and/or the rotor of an electric motor can be respectively provided with windings, traditionally formed of a coil of copper filaments. Alternatively, the stator of an electric motor can be provided with a plurality of metal bars, typically made from copper, in lieu of a coil of copper filaments (the so-called "hair pin" stators). Conversely, the rotor of an electric motor can be manufactured by using permanent magnets in lieu of a coil of copper filaments. Both the coil of copper filaments and the metal bars (but not the permanent magnets) must be impregnated with specific impregnating substances, typically consisting of resins, in order to enhance mechanical strength and electrical insulation, as well as to foster heat dispersion.

The process for impregnating a stator and/or a rotor for electric motors can be implemented by using at least three different application technologies. According to a first technology, the so-called "trickling" one, a continuous stream of resin is dripped down onto the filaments of the stator or the rotor, driven into rotation around a horizontal axis, or onto the copper bars of the stator. The resin penetrates the interstices between the individual filaments or the individual bars by capillarity, up to filling the empty spaces between these filaments or these bars.

In a second technology, the so-called "roll dip" one, the stator or the rotor is driven into rotation around a generally horizontal axis. While in rotation, each component is at least partially dipped into a resin bath. In a third technology, the so-called dipping one, the stator or the rotor is dipped into a resin bath, the axis being generally vertical and no longer in rotation in this case.

Irrespective of the technology adopted, in a process for impregnating a stator and/or a rotor for electric motors, the following steps shall be sequentially performed. In a first pre-heating step, each stator and/or rotor is heated up to a temperature that is ideal for resin application. This temperature typically ranges from 80° C. to 120° C. In this pre-heating step, there is no need for keeping the component into rotation, and heating can be performed in a variety of ways, such as, for example, by way of hot air, induction, a combination of hot air and induction, or by Joule effect, that is by making an electric current flow through the copper filaments or bars. The pre-heating step can be performed either inside specific ovens or by using other suitable equipment.

An impregnation step follows the pre-heating step, during which each component gets in contact with a liquid resin. This liquid resin fills the cavities between the individual filaments or between the copper bars and covers that part of copper which is exposed. In this impregnation step, in the case of the "trickling" and "roll dip" technologies, the component shall be kept in rotation, its axis being generally horizontal or even with an angle of inclination of the axis that typically ranges from +15° to −15° with respect to a horizontal plane. The speed and/or direction of rotation can be adjusted in order to obtain optimum impregnation results. The impregnation step is usually performed by using a specific impregnation equipment, which is separate from ovens.

Each component undergoes a gelling step after being impregnated. In this gelling step, the temperature of the component is raised, so as to trigger a resin reticulation process, which results in hardening it. During this gelling step too, in the case of the "trickling" and "roll dip" technologies, the component shall be kept in rotation in order to prevent the resin, which is still in a liquid state, from dripping away. The gelling step might require a time variable from eight to fifteen minutes for its completion, depending on the type of resin used. Conversely, in the case of the dipping technology, gelling can be obtained while the component is vertically dipped down, by making a current flow through the copper filaments or bars (Joule effect). After taking a component out of the bath, the resin around the filaments is consequently already thickened and consequently does not drip away.

In a subsequent baking step, the resin, now gelled and consequently thick, completes its own reticulation process. During the baking step, each component shall be kept at a given high temperature, but there is no need for it to be kept in rotation. The baking step can be performed either inside the same oven where the previous steps are performed, or by using another appropriate equipment. Once the baking step is over, the component undergoes a final cooling step, during which the component is cooled down either by forced ventilation (by using ambient or cooled air), or by making it remain at the ambient temperature for a predetermined period of time.

In traditional impregnation plants for stators and/or rotors of electric motors, such as, for example, the impregnation plant disclosed in document JP 6243633 B2, each component is moved between the individual work stations of the plant itself. These work stations typically comprise at least one pre-heating oven, at least one resining equipment, at least one gelling oven, at least one baking oven, and at least one cooling equipment or area. Therefore, handling to devices are necessary to transfer each individual component from one work station to another one of the impregnation plant. However, in some steps of the impregnation process, such as, for example, when passing from the resin application step to the gelling step, handling stators and/or rotors might imply "shocks" on these components, thus adversely affecting the results of impregnation qualitatively wise.

Also, in traditional impregnation plants for stators and/or rotors of electric motors, the various work stations are fixed and all of them feature a stator and/or rotor loading capacity that is almost constant. Therefore, these traditional impregnation plants are not capable of facing the changes of production volumes, i.e., increases and/or decreases in the number of components being processed in a given unit of time, effectively.

A purpose of the present invention is therefore that of implementing an impregnation plant for axial symmetrical components of electric motors, specifically a modular impregnation plant for stators and/or rotors of electric motors, that can solve the above-mentioned drawbacks of the prior art in an extremely simple, cost-effective, and particularly functional manner.

In details, a purpose of the present invention is to implement a modular impregnation plant for axial symmetrical components of electric motors that is capable of reducing the movements of the components from one work station to another one as much as possible, thus making it possible to obtain optimum impregnation results.

Another purpose of the present invention is to implement a modular impregnation plant for axial symmetrical components of electric motors that is capable of fitting changes in production volumes in a simple and fast manner.

A further purpose of the present invention is to implement a modular impregnation plant for axial symmetrical components of electric motors that is capable of simplifying the manufacturing and assembling operations of the plant itself.

These purposes according to the present invention are achieved by implementing an impregnation plant for axial symmetrical components of electric motors, in particular a modular impregnation plant for stators and/or rotors of electric motors, as set forth in claim 1.

Further characteristics of the invention are highlighted by the sub-claims, which form an integral part of the present disclosure.

The characteristics and the advantages of a modular impregnation plant for axial symmetrical components of electric motors according to the present invention will be more apparent from the following description, which is an explanatory, not limitative one, and makes reference to the schematic drawings attached hereto, wherein:

FIG. 1 is a perspective view of the main components of a preferred embodiment of the modular impregnation plant for axial symmetrical components of electric motors according to the present invention, which shows three different fixed heating stations for components, a movable operating impregnation module according to the "trickling" technology, and a movable component transport and loading/unloading operating module;

Figure 1:
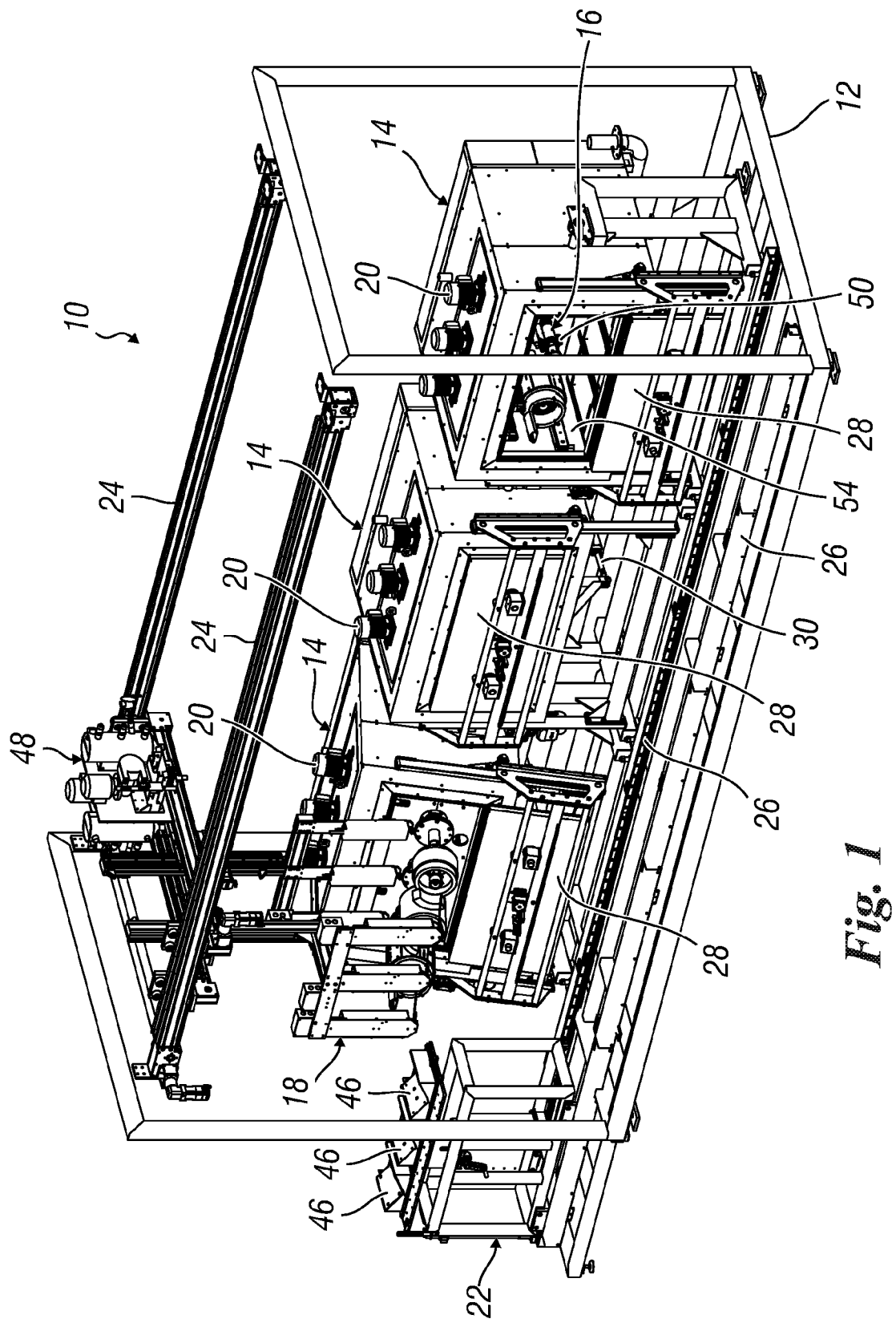
Figure 5:
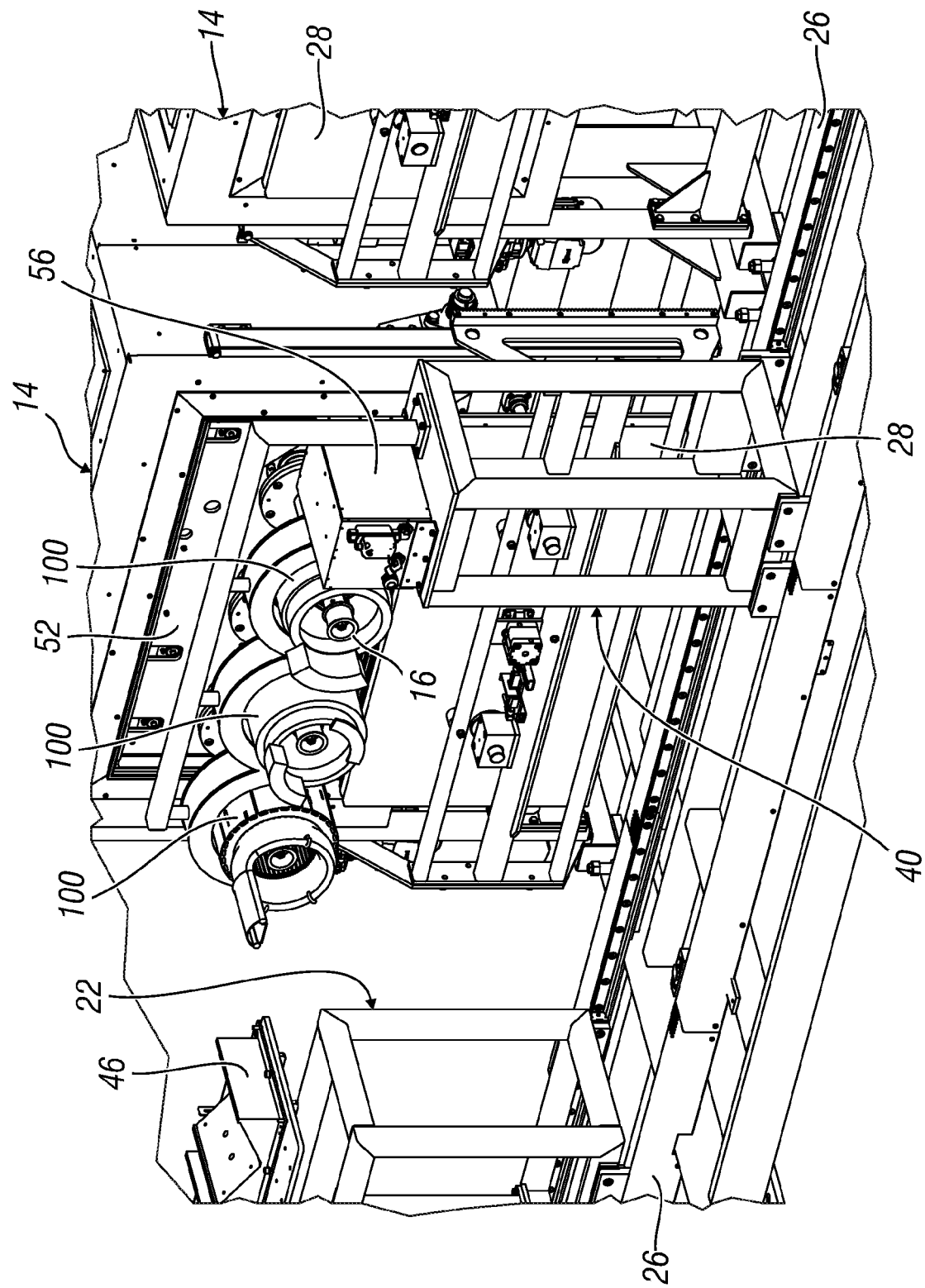
Figure 6:
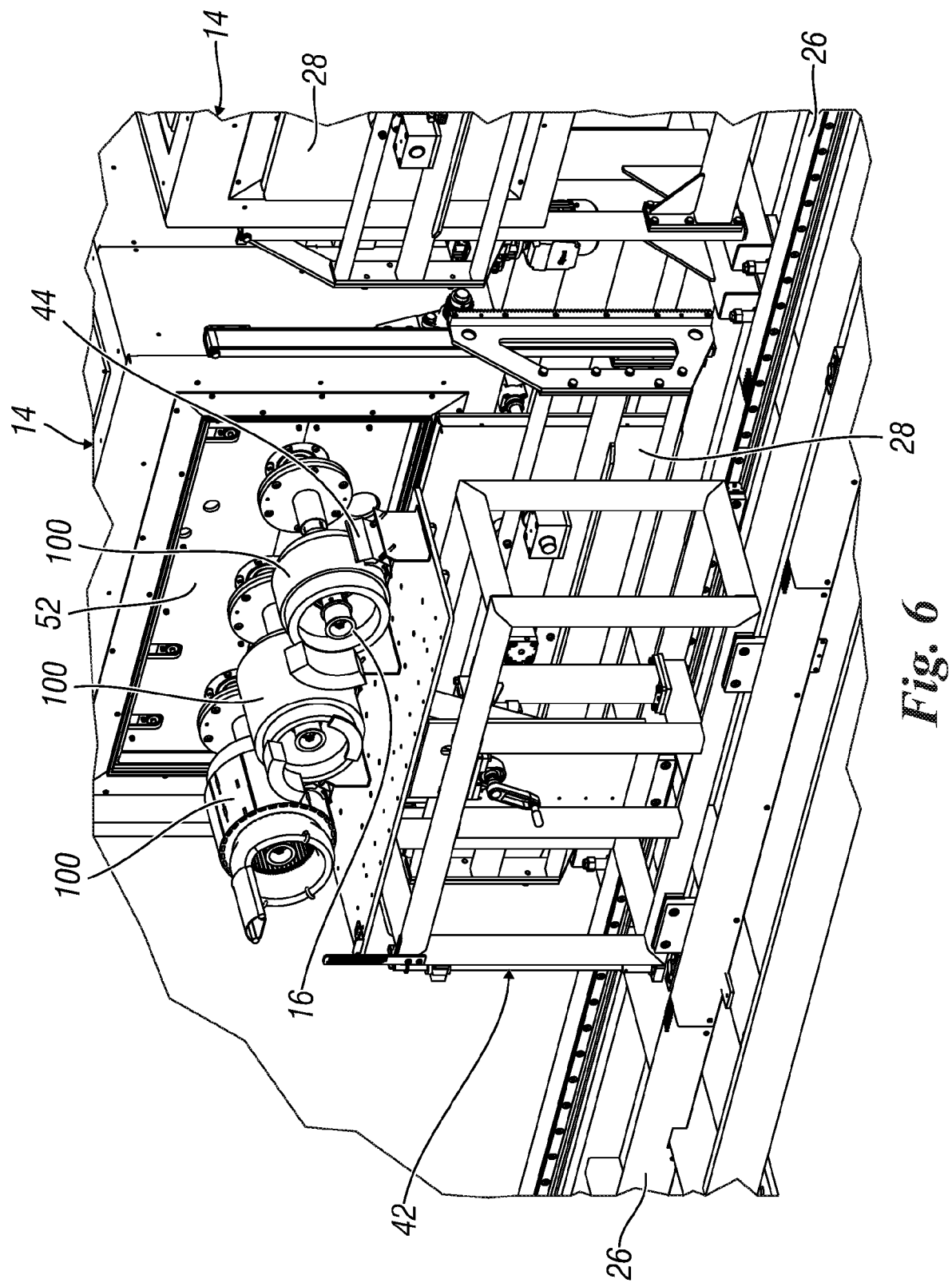

FIG. 5 is another detailed view of the plant of FIG. 1, which shows another additional module of the impregnation plant, i.e., a movable induction heating module, which is used for obtaining a fast heating of the components during the pre-heating and gelling steps; and FIG. 6 is a further detailed view of the plant of FIG. 1, which shows a further additional module of the impregnation plant, i.e., a movable infrared energy heating module, the components being inserted on appropriate support devices, consisting of expansion grippers, which are in a forward position, i.e., outside the heating chamber.

With reference to the figures, a preferred embodiment of a modular impregnation plant for axial symmetrical components of electric motors according to the present invention is shown. The impregnation plant is identified as a whole by the reference number 10. The impregnation plant 10 comprises a plurality of work stations and modules, managed and controlled by way of a central processing unit, and is arranged for impregnating axial symmetrical components 100 of electric motors, preferably cylindrical components 100, such as, for example, stators and/or rotors, with resins or other similar impregnating fluids.

The impregnation plant 10 is thus of a modular type and is configured for making it possible to implement the individual impregnation processes with different heating stations or modules by way of appropriate tools and equipment. The impregnation plant 10 comprises at least two separate stations or modules, each of which is present in a quantity of one or more samples in the impregnation plant 10 itself.

A first module of the impregnation plant 10 is a fixed module and comprises at least one apparatus, internally or close to which the main steps of the impregnation process can be implemented to impregnate the components 100. In details, this fixed module comprises at least one fixed support frame 12 and one or more fixed heating stations 14, which are arranged to heat each component 100 to a predefined temperature. Each fixed heating station 14 is provided with one or more motorized support devices 16 for supporting the components 100. Each fixed heating station 14 is thus arranged to impart a rotary movement around a predefined rotation axis, in both directions of rotation, by way of motorized support devices 16, as well as a tilting movement, with respect to a predefined plane, to each component 100 mounted on its respective support device 16. The number of heating stations 14 installed on a single fixed module of the impregnation plant 10 can vary as a function of production needs.

Thus, the impregnation plant 10 comprises one or more impregnation modules 18, which are arranged to cover at least part of each component 100 with an impregnating substance, and one or more transport and loading/unloading modules 22, which are arranged to transfer the components 100 to and from the fixed heating stations 14 of the impregnation plant 10. The support frame 12 of the impregnation plant 10 is also provided with one or more handling and guiding means 24, 26, in such a way that the impregnation modules 18, the transport and loading/unloading modules 22 and other operating modules of the impregnation plant 10, if any, which will be described later, can be mounted on such handling and guiding means 24, 26 in a movable manner.

Figure 2:
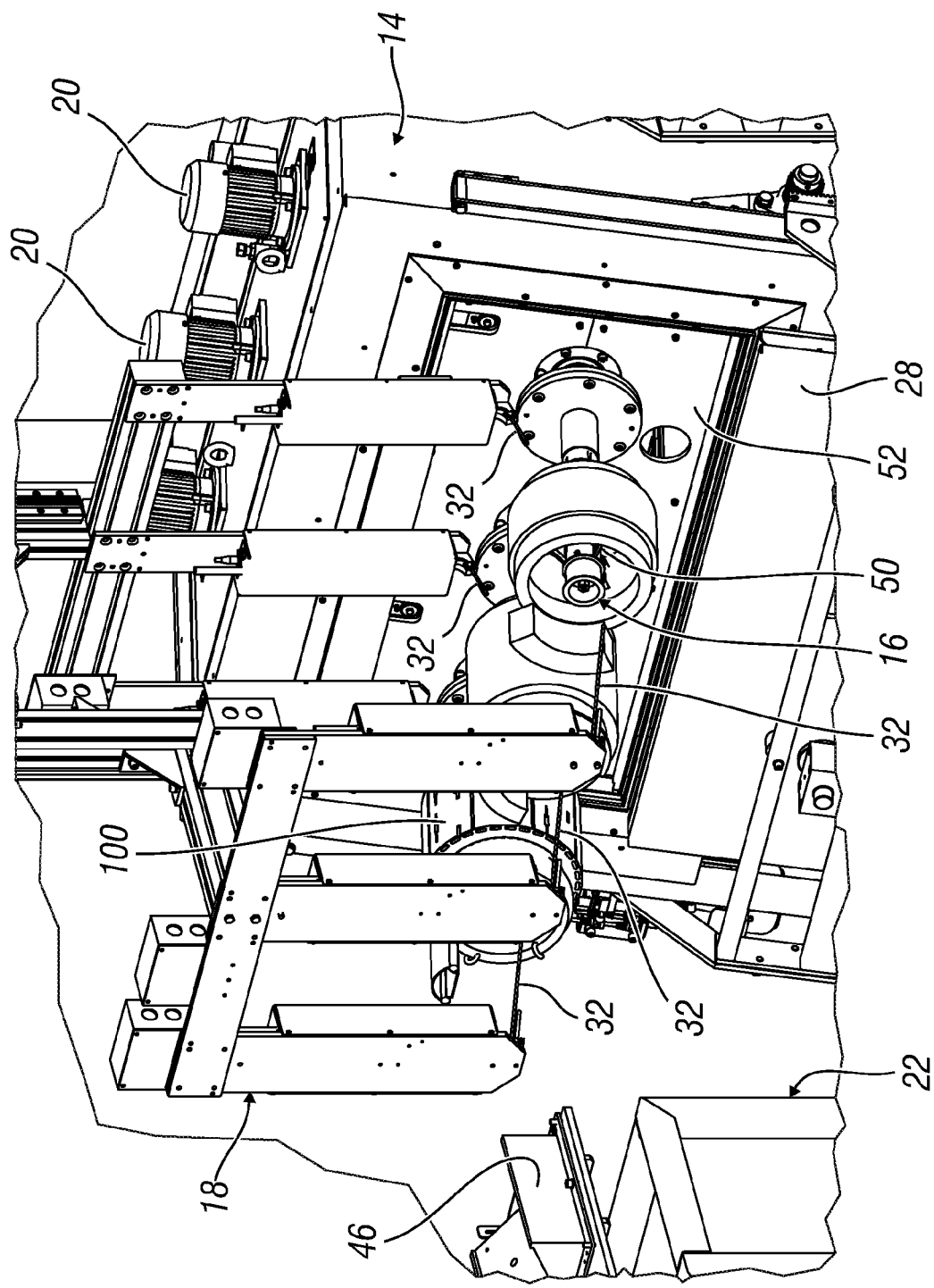
FIG. 2 is a detailed view of the impregnation plant of FIG. 1, which shows the components close to a single heating station in a forward position, i.e., outside the heating chamber, the movable impregnation device according to the "trickling" technology being in an operating position.
Figure 3:
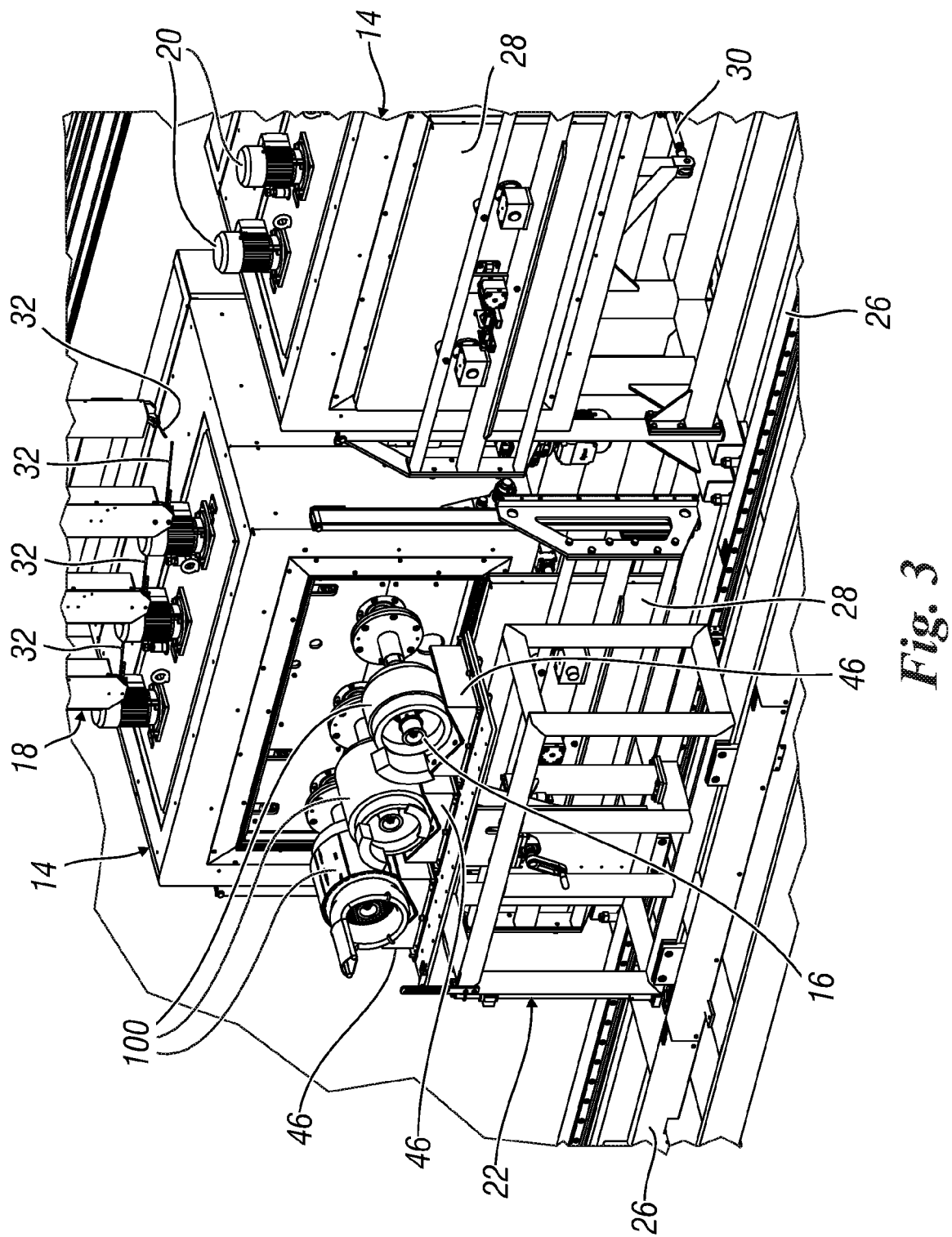
FIG. 3 is another detailed view of the plant of FIG. 1, which shows the movable component transport and loading/unloading module positioned in front of one of the heating stations, the components being inserted on appropriate support devices, consisting of expansion grippers, which are in a forward position, i.e., outside the heating chamber.

According to a preferred embodiment of the impregnation plant 10, each fixed heating station 14 comprises an oven, provided with at least one inner chamber 54 and at least one frontal closing door 28, i.e., a door arranged on a side of such oven 14. Each motorized support device 16 is thus configured to move from a retracted position, inside the inner chamber 54 of the oven 14, to a forward position, outside such inner chamber 54 of the oven 14. Each motorized support device 16 preferably consists of an expansion gripper, typically provided with gripping means 50 (partially visible in FIGS. 1 and 2) which grip a single component 100 on the inner diameter of its respective axial symmetrical body.

Preferably, one to five expansion grippers 16 can be accommodated in the inner chamber 54 of each oven 14, each expansion gripper 16 being capable of cantilever retaining a respective component 100. Each expansion gripper 16 can be driven into rotation by way of motorized rotation means 20, such as, for example, a respective dedicated brushless motor. As a matter of fact, a single motor 20 can be conveniently provided for each expansion gripper 16 when the impregnation cycle specifies a precise control of rotation for each component 100 and the need for stopping such component 100, in a precise point of rotation in order to orient it. Alternatively, a plurality of expansion grippers 16 can be driven in rotation by one motor through a timing system. The direction of rotation of each expansion gripper 16 might be either clockwise or anticlockwise and the speed of rotation of each expansion gripper 16 might be adjustable.

At least one of the expansion grippers 16, which are configured to support a single component 100 each, can also be provided with linear handling means 52, so that such expansion gripper 16 can move forward, to come out of the inner chamber 54 of the oven 14, and back, to re-enter the inner chamber 54 of the oven 14, during the operating steps of the impregnation process. For example, the linear handling means 52 might consist of a plate, which moves forward and back with respect to the inner chamber 54 of the oven 14 thanks to a linear drive, on which the expansion grippers 16 are cantilever mounted. Therefore, all expansion grippers 16 of one and the same oven 14, mounted on a single plate 52, preferably move forward and back all together.

The forward movement of each expansion gripper 16 is necessary both during the step whereby the components 100 are loaded, and during the component 100 impregnation step. The forward movement of each expansion gripper 16 can be controlled by a simple two-position (in/out) cylinder, or by a controlled axle, if different speeds and positionings are to be used, depending on the actual requirements. The latter might occur, for example, in the case of induction heating: in this event, the induction ring will be held stationary and the components 100 will be moved according to a dedicated program, the forward and retraction movement being controlled and oscillating, so as to cater for a homogeneous heating of each individual component 100.

At least one of the ovens 14 might be conveniently provided with tilt means 30, arranged to impart a tilting movement, with respect to a predefined horizontal plane, to such oven 14, and consequently also to each component 100 when said component 100 is mounted on its respective expansion gripper 16 and when said expansion gripper 16 is in a forward position outside the inner chamber 54 of the oven 14. Usually, when each expansion gripper 16 is in a retracted position within the inner chamber 54 of the oven 14, such oven 14 and consequently also each expansion gripper 16 remain in a horizontal position. For example, each tilt means 30 might consist of a hydraulic and/or electric actuator interposed between its respective oven 14, which is consequently tiltable, and the support frame 12, which conversely remains fixed.

According to the embodiment of the impregnation plant 10 shown in the attached figures, each movable impregnation module 18 is arranged to operate according to the "trickling" technology. In other words, each movable impregnation module 18 is provided with a plurality of dispensing nozzles 32 arranged to make a continuous stream of impregnating substance (resin) pour on each component 100 whenever such component 100 is in rotation on a respective expansion gripper 16 and such expansion gripper 16 is in turn in a forward position outside the inner chamber 54 of the oven 14. The tilting movement of the oven 14, which is preferably from −15° to +15° with respect to a predefined horizontal plane, makes consequently it possible to render the application of the impregnating substance (resin) on each component 100 more effective.

The handling and guiding means 24, 26 comprise one or more upper sliding guides 24, positioned on the support frame 12 at one of their respective upper ends, and/or one or more lower sliding guides 26, positioned on the support frame 12 at one rest surface, consisting, for example, of the floor on which the impregnation plant 10 rests. Consequently, each impregnation module 18 moves along the upper sliding guides 24 and is electrically controlled by the central processing unit to selectively move and position in front of each fixed heating station 14 in the moment when the component 100 impregnation step is performed according to the "trickling" technology. Each impregnation module 18 is preferably provided with at least one apparatus 48 comprising one or more impregnating substance feeding pumps, one or more, possibly thermally conditioned, tanks for storing the impregnating substance, and at least one circuit for feeding the impregnating substance to the dispensing nozzles 32.

Conversely, each transport and loading/unloading module 22 rests on and moves along the lower sliding guides 26 and is electrically controlled by the central processing unit to selectively move and position in front of each fixed heating station 14. Each transport and loading/unloading module 22 can be provided with one or more housings 46 for positioning and supporting its respective components 100. The number of housings 46 preferably equals the number of motorized support devices 16 present in each fixed heating station 14.

In addition to the housings 46 used for positioning and supporting the components 100, each transport and loading/unloading module 22 might be equipped with an opening/closing system to open/close the motorized support devices 16, should these motorized support devices 16 consist of respective expansion grippers. In this event, the opening/closing system is arranged to frontally couple with the tip of each expansion gripper 16 and allows to open/close the gripping means 50. Each transport and loading/unloading module 22 can finally be provided with a lifting (or translation) system which enables it to go beyond the fixed heating stations 14 possibly occupied by other movable operating modules of the impregnation plant 10.

As a matter of fact, in addition to the impregnation modules 18 and to the transport and loading/unloading modules 22, the handling and guiding means 24, 26 are arranged to selectively receive, in a removable manner, one or more further movable operating modules comprised in the impregnation plant 10.

Figure 4:
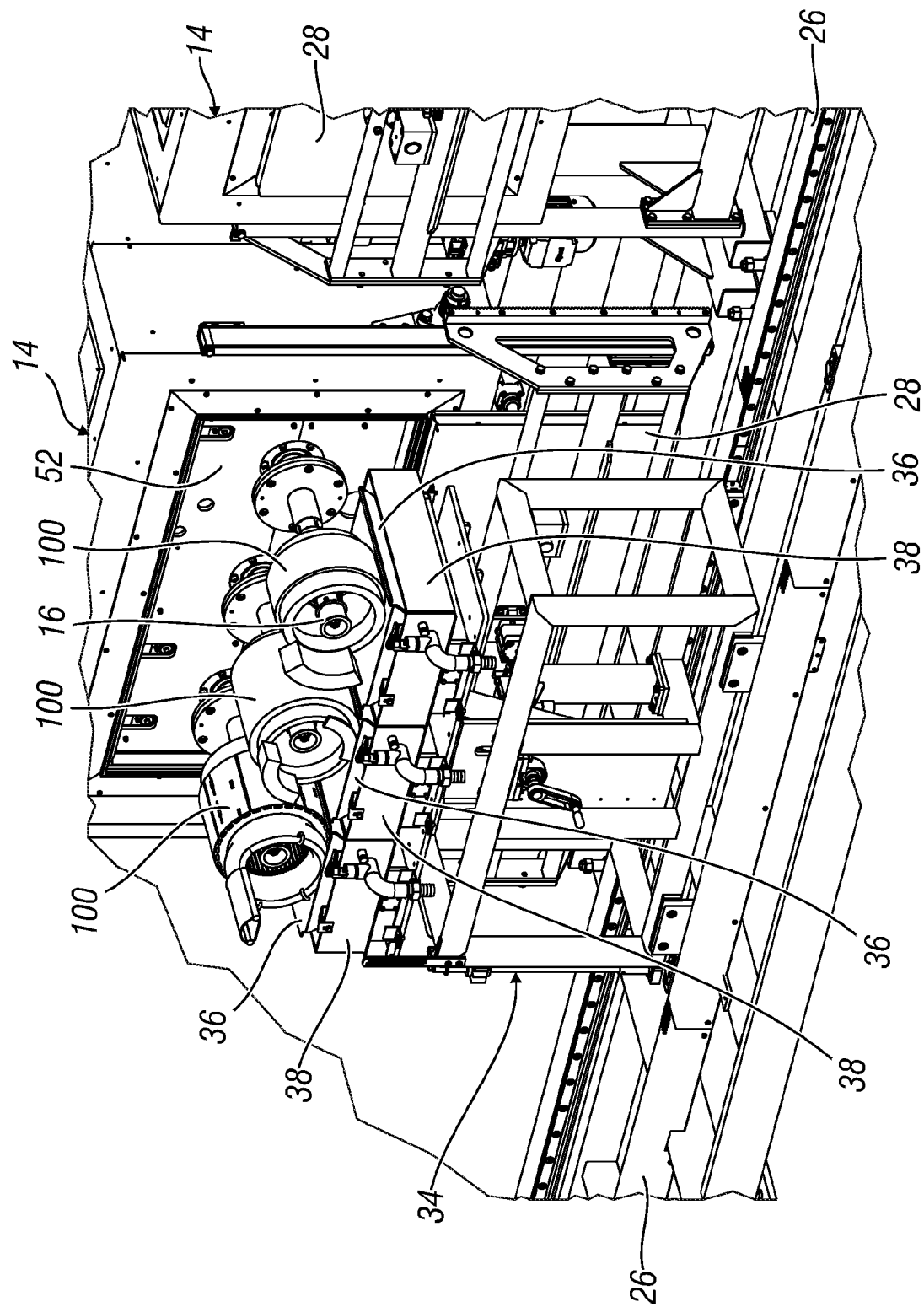
FIG. 4 is another detailed view of the plant of FIG. 1, which shows an additional module of the impregnation plant, i.e., a movable dipping impregnation plant; in this case, it is a partial immersion according to the "roll dip" technology.

For example, as shown in FIG. 4, these further movable operating modules might include at least one movable impregnation module 34 of the dipping type, preferably comprising a carriage movable along the lower sliding guides 26 of the handling and guiding means 24, 26. As a matter of fact, if the impregnation technology used in the impregnation plant 10 is of the "roll dip" type or of a simple dipping type, i.e. an impregnation technology that implies a partial or total dipping of each component 100 into an impregnating substance bath, the movable impregnating module 34 might be equipped with one or more tanks 36, each containing a predefined amount of impregnating substance, as well as at least one plant 38 for feeding and recirculating said impregnating substance, preferably comprising at least one collection tank and at least one pump for relaunching said impregnating substance.

As shown in FIG. 5, the further movable operating modules of the impregnation plant 10 might also comprise at least one movable induction heating module 40, also preferably consisting of a carriage movable along the lower sliding guides 26 of the handling and guiding means 24, 26. This movable induction heating module 40 is provided with one or more induction heating devices 56 and is positionable close to each fixed heating station 14 to perform any pre-heating and/or temperature raising operations on each component 100, should the impregnation process require it, such as, for example, before the gelling step.

As shown in FIG. 6, the further movable operating modules of the impregnation plant 10 might also comprise at least one movable infrared energy heating module 42, also preferably consisting of one carriage movable along the lower sliding guides 26 of the handling and guiding means 24, 26. This movable infrared energy heating module 42 is provided with one or more infrared heating lamps 44 and is positionable close to each fixed heating station 14 to perform any further heating operations on each component 100, should the impregnation process require it.

The impregnation process used to impregnate axial symmetrical components 100 of electric motors by using the impregnation plant 10 described so far, if implemented according to the "trickling" technology, sequentially comprises the following main steps:
- pre-heating each component 100 up to a temperature suitable for applying an impregnating substance;
- impregnating each component 100 by means of at least one of the impregnation modules 18 wherein, in this impregnation step, each component 100 is kept in rotation on a respective support device 16 of at least one of the heating stations 14, and wherein the impregnation module 18 is moved by way of the handling and guiding means 24, 26 to position at the heating station 14, so as to dispense the impregnating substance onto the component 100;
- gelling the impregnating substance dispensed onto each component 100, while this component 100 is kept in rotation on its respective support device 16 of the heating station 14, up to reaching a temperature suitable for making it possible to bake the impregnating substance;
- baking each component 100, so as to obtain a final solidification of the impregnating substance; and
- cooling each component down.

The fixed module of the impregnation plant 10 is either used for the complete impregnation process (pre-heating, impregnation, gelling and cooling steps), or for the most critical steps only, that is to say:
- in the case of the "trickling" and "roll dip" technologies, at least for the impregnation and gelling steps, during which each component 100 is to be kept in rotation;
- in the case of the "trickling" and dipping technologies, if heating is obtained by Joule effect, during which each component 100 is to be submitted to an electric voltage.

This means that, if the production cycle requires it, it will be possible to load already pre-heated components 100 on the impregnation plant 10. In this event, pre-heating might have been previously performed in a traditional oven, the components 100 being in static conditions. Alternatively or in addition, the components 100 might be unloaded from the impregnation plant 10 after gelling, by stopping the baking operation, and be subsequently submitted to cooling in external ovens and in static refrigerators respectively.

It has been thus shown that the modular impregnation plant for axial symmetrical components of electric motors according to the present invention fulfils the previously highlighted purposes, and makes it possible to achieve the following advantages:
- thanks to the individual components (stators and/or rotors) being not moved from one work station to another one of the impregnation plant according to the present invention, less "shocks" are caused on the components being worked, especially during the resin application and gelling steps, hence a qualitatively better impregnation result is achieved;
- the impregnation plant according to the present invention being modular, makes it possible to manage an increase of production volume in a simple manner, by adding any additional modules, such as for instance heating modules, in a "step by step" manner, without being obliged to stop production;
- the impregnation plant according to the present invention being modular makes also it possible to easily add any additional heating modules that might be necessary because of modifications in the production volumes (for example, a low production does not require to speed up the heating times guaranteed by induction), the type of resins to use, or the shape of the components to be impregnated;
- productively wise, the impregnation plant according to the present invention being modular makes it possible for the plant manufacturer to produce the individual component parts in series and to subsequently assemble them as a function of the customer's requirements, thus shortening delivery times;
- the impregnation and (induction and/or infrared energy) heating modules being movable makes it possible for these modules to be used at different instants in time; in a traditional impregnation plant, wherein each component to be impregnated follows a predetermined path, for instance in order to implement a steep increase of temperature during the pre-heating step and another steep increase of temperature during the gelling step, it is necessary to install two different, typically induction, heating apparatuses; conversely, in the impregnation plant according to the present invention it is possible to always use the same heating module which, by moving, intervenes at the right instant in time; the same concept applies to the movable impregnation module, which is usable several times, should the impregnation cycle require multiple applications of the impregnating substance, spaced in time by one or more gelling steps.

The modular impregnation plant for axial symmetrical components of electric motors according to the present invention is therefore particularly suited to the historical time period we are experiencing, by providing a great product flexibility and enabling users to make their investments gradually and imparting total configurability to the impregnation process.

The modular impregnation plant for axial symmetrical components of electric motors according to the present invention, being so conceived, is in any case susceptible of numerous modifications and variants, all falling within the same inventive concept; also, all details are replaceable by technically equivalent elements. In practice, the materials used, as well as their shapes and dimensions, might be whatsoever according to the technical requirements.

Therefore, the scope of protection of the invention is that set forth by the attached claims.

The invention claimed is:

1. An impregnation plant for axial symmetrical components of electric motors, said plant having a plurality of work stations and modules managed and controlled through a central processing unit, said plant comprising:
   - at least one fixed support frame;
   - one or more fixed heating stations, which are arranged to heat each component to a predefined temperature;

one or more impregnation modules, which are arranged to cover at least part of each component with an impregnating substance; and one or more transport and loading/unloading modules, which are arranged to transfer said components from and toward said one or more fixed heating stations, wherein said fixed support frame is provided with one or more handling and guiding means, wherein said one or more impregnation modules and said one or more transport and loading/unloading modules are mounted on said one or more handling and guiding means in a movable manner, and wherein said one or more handling and guiding means are arranged to selectively receive, in a removable manner, one or more further movable work modules comprised in said impregnation plant, wherein each of the one or more fixed heating stations is provided with one or more motorized support devices for supporting said components, each of the one or more fixed heating stations being arranged to impart both a rotary movement, through said one or more motorized support devices and in both directions of rotation around a predefined rotation axis, and a tilting movement, with respect to a predefined plane, on each component mounted on its respective support device, wherein said handling and guiding means comprise one or more upper sliding guides, positioned on said fixed support frame at an upper end of said fixed support frame, and one or more lower sliding guides, positioned on said fixed support frame at a rest surface, wherein each of the one or more impregnation modules moves along said upper sliding guides and is electrically controlled, through said central processing unit, to selectively move and position in front of each of the one or more fixed heating stations in the moment when the impregnation of said components is performed, and wherein each of the one or more transport and loading/unloading modules rests and moves along said lower sliding guides and is electrically controlled, through said central processing unit, to selectively move and position in front of each of the one or more fixed heating stations.

2. The impregnation plant according to claim 1, wherein each of the one or more fixed heating stations consists of an oven provided with at least one inner chamber and at least one closing door, wherein each motorized support device is configured to move between a retracted position, within the inner chamber of said oven, and a forward position, outside the inner chamber of said oven.

3. The impregnation plant according to claim 2, wherein each motorized support device consists of an expansion gripper, which is provided with both gripping means and motorized rotation means, wherein said gripping means block a single component, by gripping the inner diameter of the axial symmetrical body of said single component, to cantilever retain said single component on said expansion gripper, and wherein said motorized rotation means are configured to rotate said expansion gripper in a clockwise or anticlockwise rotation and at an adjustable rotation speed.

4. The impregnation plant according to claim 3, wherein at least one of said expansion grippers is provided with linear handling means, so that said at least one expansion gripper can be moved forward, to come out of the inner chamber of said oven, and moved back, to re-enter the inner chamber of said oven, said linear handling means consisting of a plate, which moves forward and back with respect to the inner chamber of said oven due to a linear drive, wherein said expansion grippers are cantilever mounted on said plate.

5. The impregnation plant according to claim 4, wherein at least one of the ovens is provided with tilting means, arranged to impart a tilting movement, with respect to a predefined horizontal plane, to said oven and consequently also to each component when said component is mounted on its respective expansion gripper and when said expansion gripper is in a forward position outside the inner chamber of said oven.

6. The impregnation plant according to claim 5, wherein each tilting means has a hydraulic and/or electric actuator which is interposed between its respective oven and said fixed support frame.

7. The impregnation plant according to claim 4, wherein each of the one or more impregnation modules is provided with a plurality of dispensing nozzles arranged to pour a continuous stream of impregnating substance onto each component when said component is in rotation on a respective expansion gripper and when said expansion gripper is in turn in a forward position outside the inner chamber of said oven.

8. The impregnation plant according to claim 1, wherein each of the one or more impregnation modules is provided with at least one apparatus comprising one or more pumps for feeding an impregnating substance, one or more tanks for storing the impregnating substance, and at least one circuit for feeding the impregnating substance.

9. The impregnation plant according to claim 1, wherein each of the one or more transport and loading/unloading modules is provided with one or more housings for positioning and supporting its respective components.

10. The impregnation plant according to claim 1, wherein said one or more further movable work modules are selected from the group comprising of:

at least one movable impregnation module of the dipping type, comprising a carriage movable along said handling and guiding means, wherein each movable impregnation module comprises one or more tanks, each containing a predefined amount of impregnating substance, as well as at least one plant for feeding and recirculating said impregnating substance, comprising at least one collection tank and at least one pump for relaunching said impregnating substance;

at least one movable induction heating module, consisting of one carriage that is movable along said handling and guiding means, wherein each movable induction heating module is provided with one or more induction heating devices and can be positioned close to each of the one or more fixed heating stations to carry out any pre-heating and/or temperature raising operations on each component; and at least one movable infrared energy heating module, consisting of a carriage that is movable along said handling and guiding means, wherein each infrared energy heating movable module is provided with one or more infrared heating lamps and can be positioned close to each of the one or more fixed heating stations for carrying out any further heating operations on each component.

11. A process for impregnating axial symmetrical components of electric motors by using an impregnation plant according claim 1, the process sequentially comprising the following steps:

pre-heating each component up to a temperature suitable for applying an impregnating substance;

impregnating each component by means of at least one of said impregnation modules, wherein in this impregnation step each component is kept in rotation on a respective support device of at least one of said heating stations and wherein said at least one impregnation module is moved by means of said one or more handling and guiding means to position at said at least one of said heating stations, so as to dispense the impregnating substance onto said component;

gelling the impregnating substance dispensed on each component, wherein said component is kept in rotation on its respective support device of said at least one of said heating stations up to reaching a temperature suitable for baking said impregnating substance;

baking each component, so as to obtain a final solidification of said impregnating substance; and cooling down each component.

12. The impregnation plant according to claim 6, wherein said tilting movement ranges from −15° to +15° with respect to said predefined horizontal plane.

* * * * *